(12) United States Patent
Eleftheriou et al.

(10) Patent No.: US 9,902,106 B2
(45) Date of Patent: Feb. 27, 2018

(54) MOLD FOR A BLOW-MOLDING MACHINE AND A BLOW-MOLDING MACHINE INCLUDING SUCH A MOLD

(71) Applicant: Serac Group, La Ferte Bernard (FR)

(72) Inventors: Stylianos Eleftheriou, Marly-le-Roi (FR); Loys Millescamps, Buc (FR)

(73) Assignee: Serac Croup, La Ferte Bernard (FR)

(*) Notice: Subject to any disclaimer, the term of this patent is extended or adjusted under 35 U.S.C. 154(b) by 0 days.

(21) Appl. No.: 14/845,844

(22) Filed: Sep. 4, 2015

(65) Prior Publication Data

US 2016/0067904 A1 Mar. 10, 2016

(30) Foreign Application Priority Data

Sep. 5, 2014 (FR) ..................... 14 58362

(51) Int. Cl.

| *B29C 49/62* | (2006.01) |
|---|---|
| *B29C 33/10* | (2006.01) |
| *B29C 33/30* | (2006.01) |
| *B29C 49/64* | (2006.01) |
| *B29K 105/00* | (2006.01) |
| *B29L 31/00* | (2006.01) |
| *B29C 49/48* | (2006.01) |

(52) U.S. Cl.
CPC ............ *B29C 49/62* (2013.01); *B29C 33/302* (2013.01); *B29C 49/6418* (2013.01); *B29C 33/10* (2013.01); *B29C 2049/4892* (2013.01); *B29C 2049/625* (2013.01); *B29K 2105/258* (2013.01); *B29L 2031/7158* (2013.01)

(58) Field of Classification Search
CPC ... B29C 49/48; B29C 49/62; B29C 2049/622; B29C 33/301; B29C 33/302
See application file for complete search history.

(56) References Cited

U.S. PATENT DOCUMENTS

| 4,120,635 A * | 10/1978 | Langecker | B29C 49/48 425/451.9 |
|---|---|---|---|
| 5,031,483 A * | 7/1991 | Weaver | B21D 37/20 451/5 |
| 5,921,416 A * | 7/1999 | Uehara | B29C 49/18 215/12.1 |
| 5,935,620 A * | 8/1999 | Baudin | B29C 33/005 425/522 |

(Continued)

FOREIGN PATENT DOCUMENTS

| JP | S 62196119 | 8/1987 |
|---|---|---|
| JP | H 06226827 | 8/1994 |

*Primary Examiner* — Robert B Davis
(74) *Attorney, Agent, or Firm* — Muncy, Geissler, Olds & Lowe, P.C.

(57) ABSTRACT

A mold comprising at least two mold portions, at least one of which includes a vent opening out to the inside of the cavity and to the outside of the mold and presenting a flow section that is predetermined to enable air to be exhausted when the mold is closed. Said mold portion comprises at least two parts that extend over an entire dimension of the mold cavity and that are assembled together, the parts being held apart from each other by at least one spacer so as to define between them a gap that opens out to the inside of the cavity and to the outside of the mold in order to form the vent. A blow-molding machine including such a mold.

4 Claims, 3 Drawing Sheets

(56) References Cited

U.S. PATENT DOCUMENTS

| | | | | |
|---|---|---|---|---|
| 6,457,967 B1* | 10/2002 | Suzuki | ................... | B29C 49/28 |
| | | | | 425/452 |
| 2009/0142549 A1* | 6/2009 | Manuel | ................ | B23P 15/246 |
| | | | | 428/137 |

* cited by examiner

MOLD FOR A BLOW-MOLDING MACHINE AND A BLOW-MOLDING MACHINE INCLUDING SUCH A MOLD

The present invention relates to the field of shaping materials by means of a mold. More particularly, the invention relates to a mold and to a blow-molding machine including such a mold.

Machines are known for blow-molding articles from a tube of heat-softenable material such as a thermoplastic material. Said material is either extruded directly in the form of a tube, or is initially made in the form of a strip that is subsequently shaped into a tube. Such a blow-molding machine comprises heater means, means for bringing the tube to the mold through the heater means, and a member for injecting air into the tube. The mold comprises at least two mold portions that are movable relative to each other between a closed position, in which they define a mold cavity, and an open position. On closing the mold, a length of tube that has previously been heated is enclosed within the mold and the air that is injected into this length of tube inflates the tube so as to press it against the cavity-defining inside wall of the mold. Thereafter the mold is opened in order to enable the resulting article to be removed and in order to enable a new length of heated tube to be positioned between the mold portions.

During blowing, while the mold is closed, it is necessary to exhaust the air held captive between the tube and the inside wall of the mold, otherwise the captive air would lead to a defect in the shape of the article. For this purpose, at least one of the mold portions includes a vent opening out into the inside of the cavity and to the outside of the mold. The vent has a circular flow section appropriate for allowing a flow of air that is sufficient to ensure that all of the captive air is expelled through the vent by the pressure exerted by the tube while it is being inflated.

It is therefore important for the vent to have a section that is as large as possible so that all of the air can be exhausted from the mold by the tube deforming. Nevertheless, if its section is too great, there is a risk of the material that has been softened by heating penetrating a little into the vent under the blow-molding pressure, thereby generating a surface or shape defect in the article.

An object of the invention is to provide means for solving that problem.

For this purpose, the invention provides a mold comprising at least two mold portions that are movable relative to each other between a closed position in which they define a cavity and an open position. At least one of the mold portions includes a vent opening out to the inside of the cavity and to the outside of the mold and having a flow section that is predetermined to allow air to be exhausted when the mold is closed. Said mold portion comprises at least two parts that extend over an entire dimension of the mold cavity and that are assembled together, the parts being held apart from each other by at least one spacer so as to define between them a gap that opens out to the inside of the cavity and to the outside of the mold in order to form the vent.

Thus, the gap extends over an entire dimension of the mold portion so it can be relatively long with a thickness that is relatively small, thereby enabling the air to be exhausted while limiting any risk of softened material penetrating into the gap. The thickness of the gap is constant and it is equal to the thickness of the spacer: the cavity is thus in continuous communication with the environment outside the mold throughout the molding operation.

Preferably, the two mold portions comprise parts that are assembled together and that are held spaced apart from one another by at least one spacer so as to define a gap between them, and/or said or each mold portion comprises a plurality of parts defining a plurality of gaps, each gap having a flow section such that the sum of the flow sections of the gaps is equal to the flow section of the vent.

The flow section is then further increased while the thickness of the gap can be decreased so as to further reduce any risk of softened material penetrating into the vent.

The invention also provides a machine for blow-molding articles from a tube of material, the machine including means for feeding a tube to a mold of the invention, tube heater means upstream from the mold, and a member for blowing air into the tube.

Other characteristics and advantages of the invention appear on reading the following description of particular, non-limiting embodiments of the invention.

Reference is made to the drawings, in which.

Figure 1:
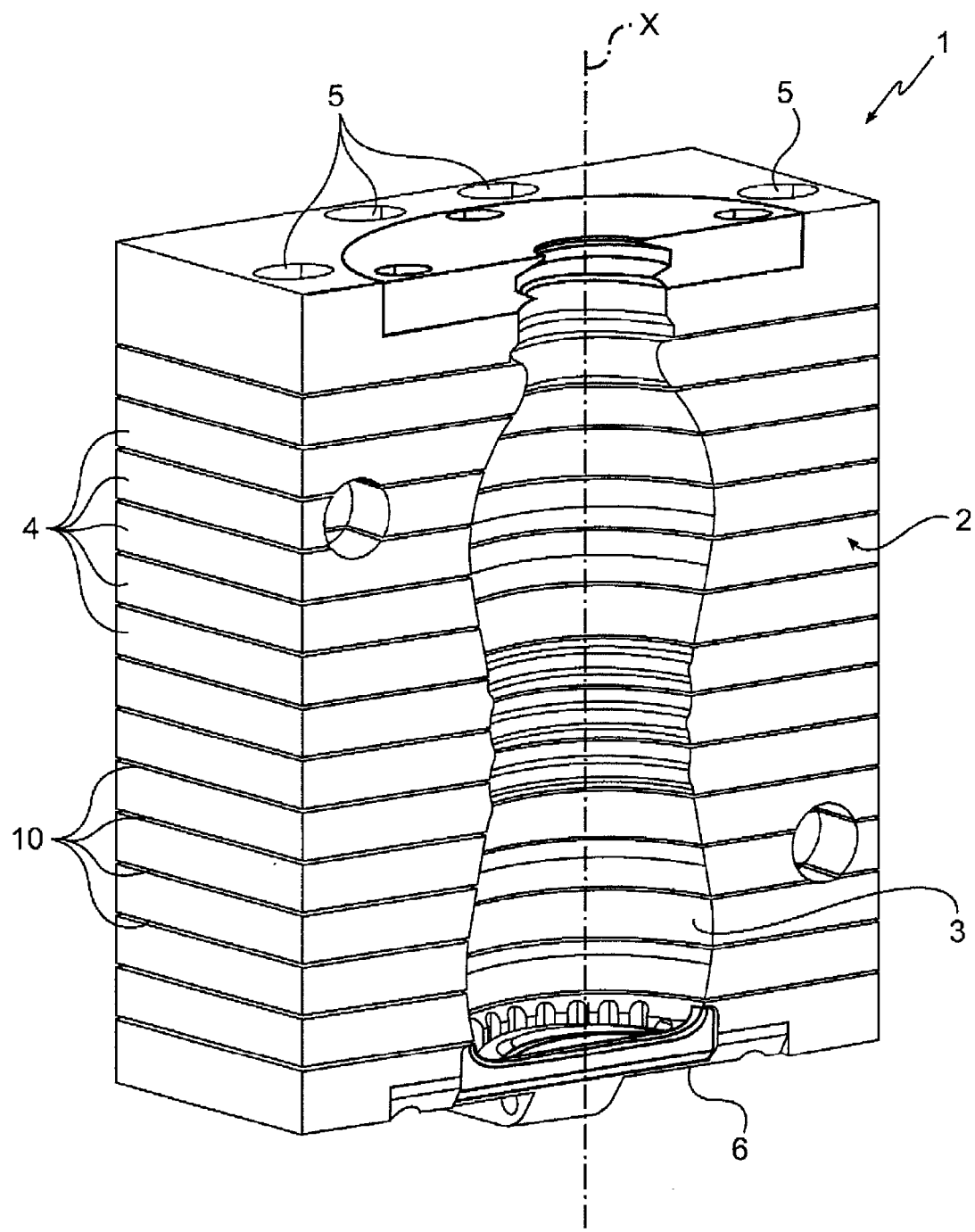
FIG. 1 is a diagrammatic perspective view of a mold in accordance with the invention.
Figure 2:
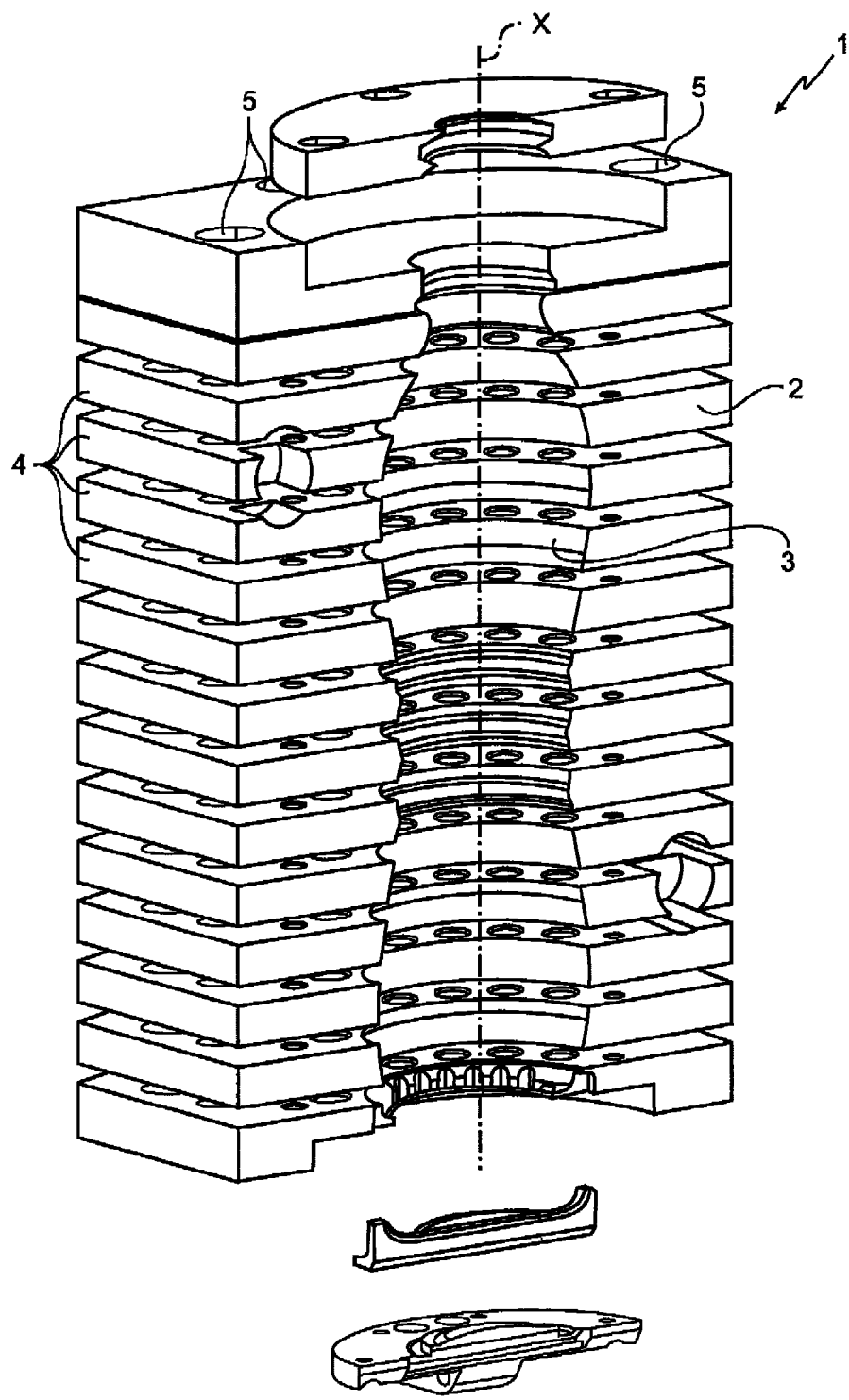
FIG. 2 is an exploded diagrammatic perspective view of a mold in accordance with the invention.
Figure 3:
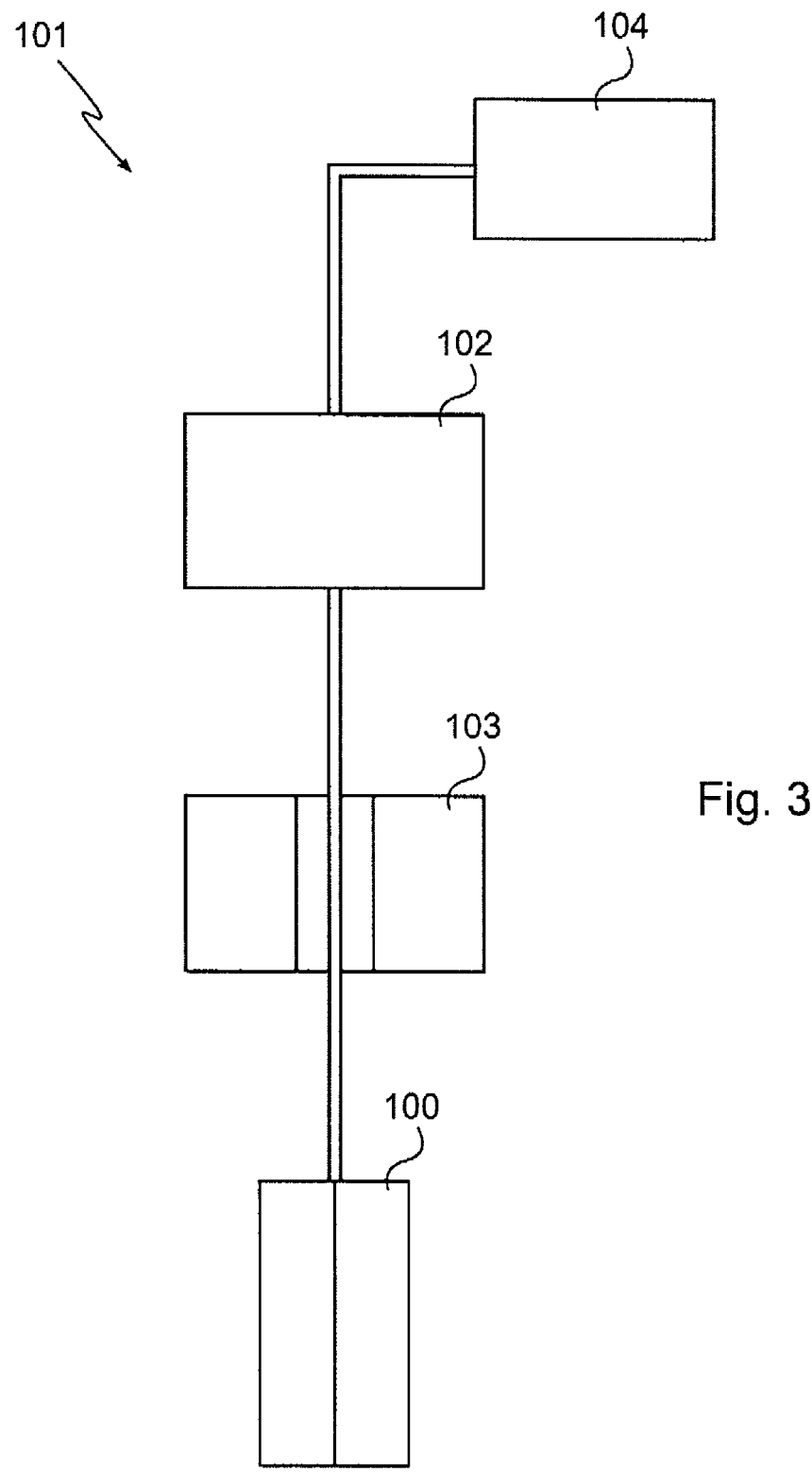
FIG. 3 is a diagrammatic perspective view of a blow-molding machine in accordance with the invention.

With reference to the figures, the mold of the invention, given overall reference 100, comprises two mold portions given overall references 1, with only one of them being shown in the figures, each mold portion having an inside wall 2 that defines a portion of a mold cavity 3.

The mold portions 1 are movable relative to each other between a closed position and an open position. For this purpose, in conventional manner, the mold portions 1 are mounted on a structure and they are associated with an actuator. When the mold portions 1 are in the closed position, the cavity portions 3 are united to define a single cavity. The mold of the invention in this example is for fabricating containers having a body surmounted by a neck and having a central axis. The shape of the cavity corresponds to the outside shape of the container and it possesses a longitudinal axis X coinciding with the central axis of the container.

Each of the two mold portions 1 is made up of a plurality of parts that are stacked on one another. In this example, the parts are in the form of parallel-faced plates forming slices 4 of the mold portions 1. The slices 4 are perpendicular to the axis X and they are stacked along that axis. Between each pair of adjacent slices 4 there extends at least one spacer (not shown in the figures) serving to hold two slices 4 spaced apart from each other in order to define a gap 10 between the two slices 4. The gap 10 extends over an entire dimension of the mold cavity, and in this example even over an entire dimension of the mold portion 1 (each gap 10 extends parallel to a plane extending transversely to the axis X so as to open out to the outside of the mold 100 through three of its sides, with the mold 100 in this example having a section of rectangular outline). Columns parallel to the axis X are engaged in holes 5 in the slices 4 in order to hold the slices 4 in position in directions extending transversely to the axis X.

The mold thus includes a plurality of gaps 10 together forming a vent that opens out to the inside of the cavity and to the outside of the mold 100 and that presents a flow section equal to the sum of the flow sections of the gaps 10. The flow section of the vent is determined so as to enable a sufficient amount of air to be evacuated when the mold is closed.

Each mold portion 1 is also provided with a retractable bottom 6 to facilitate removing molded articles after opening the mold portions 1.

The mold 100 of the invention is described herein in its application to a blow-mold machine 101 having a device 102 for feeding the machine with heat-softenable material in the form of a tube and for moving the tube inside the machine along a vertical travel path. The heat-softenable material in this example is a thermoplastic material.

Downstream from the device 102, there are mounted in succession along the travel direction both an oven 103 and also the mold 100 in such a manner that the tube is taken through the oven 103 and then into the mold 1. The machine 100 also has a member 104 for blowing air into the tube.

The operation of the blow-molding machine 101 is conventional and is not described in detail herein. The flow section of the vent 100 is determined to make it possible during blowing while the mold 100 is closed to exhaust a large enough amount of the air held captive between the tube and the inside wall 2 of the mold 100 defining the cavity. This mold section is defined by the number of gaps 10 and not by the thickness of the gaps, which thickness is selected so that the material constituting the tube, once it has been softened, cannot penetrate into the gaps 10 during blow-molding.

Naturally, the invention is not limited to the embodiments described but covers any variant coming within the ambit of the invention as defined by the claims.

In particular, the invention is applicable specifically to blow-molding machines making use of a tube that is extruded or that is formed by welding a flat strip.

It is possible for only one of the mold portions to be made as an assembly of parts.

The number of gaps is determined as a function of the rate at which it is desired to exhaust air.

The spacers holding the slices spaced apart from one another may be made integrally with said slices or they may be separate from them.

The invention claimed is:

1. A mold comprising:
   at least two mold portions that are movable relative to each other between a closed position in which they define a cavity and an open position, at least one of the mold portions including a vent opening out to the inside of the cavity and to the outside of the mold and having a flow section that is predetermined to allow air to be exhausted when the mold is closed,
   wherein said mold portion comprises at least two parts that extend over an entire dimension of the mold cavity and that are assembled together, the parts being held apart from each other by at least one spacer so as to define between them a gap that opens out to the inside of the cavity and to the outside of the mold in order to form the vent, the gap extending along a plane transverse to a side surface of the mold and opening out to the outside of the mold through the side surface of the mold.

2. The mold according to claim 1, wherein the two mold portions comprise parts that are assembled together and that are held spaced apart from one another by at least one spacer so as to define a gap between them, each gap having a flow section such that the sum of the flow sections of the gaps is equal to the flow section of the vent.

3. The mold according to claim 1, wherein said or each mold portion comprises a plurality of parts defining a plurality of gaps each having a flow section such that the sum of the flow sections of the gaps is equal to the flow section of the vent.

4. A machine for blow-molding articles from a tube of material, the machine including tube feed means for feeding a mold as claimed in claim 1, tube heater means upstream from the mold, and a member for blowing air into the tube.

\* \* \* \* \*